(12) United States Patent
Yasugi et al.

(10) Patent No.: US 7,973,793 B2
(45) Date of Patent: Jul. 5, 2011

(54) SCENARIO GENERATION DEVICE, SCENARIO GENERATION METHOD, AND SCENARIO GENERATION PROGRAM

(75) Inventors: Makoto Yasugi, Kanagawa (JP); Sachiko Uranaka, Tokyo (JP); Koichi Emura, Kanagawa (JP); Toshiyuki Tanaka, Tokyo (JP); Seiya Miyazaki, Kanagawa (JP)

(73) Assignee: Panasonic Corporation, Osaka (JP)

( * ) Notice: Subject to any disclaimer, the term of this patent is extended or adjusted under 35 U.S.C. 154(b) by 747 days.

(21) Appl. No.: 11/916,899

(22) PCT Filed: Jun. 8, 2006

(86) PCT No.: PCT/JP2006/311555
§ 371 (c)(1),
(2), (4) Date: Dec. 7, 2007

(87) PCT Pub. No.: WO2006/132332
PCT Pub. Date: Dec. 14, 2006

(65) Prior Publication Data
US 2009/0033666 A1   Feb. 5, 2009

(30) Foreign Application Priority Data
Jun. 10, 2005   (JP) .................................. 2005-171492

(51) Int. Cl.
*G06T 13/00*   (2006.01)
(52) U.S. Cl. ......................... 345/473; 345/419; 345/420
(58) Field of Classification Search .................. None
See application file for complete search history.

(56) References Cited

U.S. PATENT DOCUMENTS

| 6,160,558 | A | 12/2000 | Motegi |
| 6,369,821 | B2 * | 4/2002 | Merrill et al. ................. 345/473 |
| 6,608,624 | B1 * | 8/2003 | Wang ............................ 345/473 |

(Continued)

FOREIGN PATENT DOCUMENTS

JP   60-171572   9/1985

(Continued)

OTHER PUBLICATIONS

Coyne, B., Sproat, R., WordsEye: an automatic text-to-scene conversion system, 2001, Proceedings of the 28th annual conference on Computer graphics and interactive techniques, pp. 486-497.*
English language Abstract of JP 8-123976.
English language Abstract of JP 2002-159738.
English language Abstract of JP 63-032664.

(Continued)

*Primary Examiner* — Said Broome
(74) *Attorney, Agent, or Firm* — Greenblum & Bernstein, P.L.C.

(57) ABSTRACT

There is provided a scenario generation device capable of automatically generating a scenario for generating an animation of rich expression desired by a user even from a text created by the user who has no special knowledge about creation of animation. In the device, a scenario generation unit generates a scenario from a text inputted by the user, and a scenario edition unit edits a scenario with information recalled from words in the generated scenario by using external information acquired by an external information acquisition unit. That is, the scenario generation device recognizes information to be added to the text created by the user and adds information to the scenario by using external information acquired from a device owned by the user and a device existing in a communicable range. Thus, even the user has no special knowledge, the user can generate a scenario for realizing animation of expression near to the user's intention.

10 Claims, 14 Drawing Sheets

U.S. PATENT DOCUMENTS 7,512,537 B2 * 3/2009 Pahud et al. .................. 704/272

FOREIGN PATENT DOCUMENTS

| JP | 63-032664 | 2/1988 |
| --- | --- | --- |
| JP | 6-259528 | 9/1994 |
| JP | 8-123976 | 5/1996 |
| JP | 10-232951 | 9/1998 |
| JP | 10-307931 | 11/1998 |
| JP | 2002-159738 | 6/2002 |

OTHER PUBLICATIONS

U.S. Appl. No. 11/720,376 to Uranaka et al., filed May 29, 2007.

Yamaguchi et al., "A Study on the Scenarios Extracting Process from Description on Fragmentary Experiences", SIG-FAI-A301, pp. 83-88, Jan. 27, 2004.

Watanabe et al., "Conversational ellipsis and its complement", IPSJ SIG Notes, vol. 2000, No. 119, pp. 149-154, Dec. 21, 2000.

Japan Office action, mailed Apr. 5, 2011.

* cited by examiner

110a

| WORD 201 | EXPRESSION 202 | CLASSIFICATION 203 |
|---|---|---|
| YESTERDAY | $(YESTERDAY) | DATE |
| DAYTIME | $(AROUND 12 O' CLOCK) | DATE |
| I | $(USER) | CHARACTER |
| HAVE A MEAL | $(EAT) | ACTION |
| ... | ... | ... |

FIG.2

| | | 300 | |
|---|---|---|---|
| SCENARIO INFORMATION NAME | INFORMATION CLASSIFICATION | | CONTENT |
| SCENE NUMBER | NUMBER | | 1 |
| SCENE INFORMATION | LOCATION | | |
| | DATE | | $(YESTERDAY),$(AROUND 12 O'CLOCK) |
| | ENVIRONMENT | | |
| CHARACTER INFORMATION | PERSON 1: NAME | | $(USER) |
| | PERSON 1: (ATTRIBUTE, ATTRIBUTE VALUE) | | |
| ACTION INFORMATION | ACTOR | | $(USER) |
| | ACTION/STATE | | $(EAT) |
| | ACTION TARGET | | |

| KNOWLEDGE ID | KNOWLEDGE APPLICATION REQUIREMENT | SCENARIO EDITING RULE | EXTERNAL INFORMATION |
|---|---|---|---|
| 000 | LOCATION OF SCENE INFORMATION IS UNDEFINED | DESCRIBE $(LOCATION{$(DATE)}) IN LOCATION OF SCENE INFORMATION | "LOCATION{$(DATE)}" |
| 010 | DATE OF SCENE INFORMATION IS $(TODAY) | DELETE $(TODAY) FROM DATE OF SCENE INFORMATION AND DESCRIBE $(DATE) | "DATE" |
| 011 | DATE OF SCENE INFORMATION IS $(YESTERDAY) | DELETE $(YESTERDAY) FROM DATE OF SCENE INFORMATION AND DESCRIBE $(DATE)-1 | "DATE" |
| 020 | ENVIRONMENT OF SCENE INFORMATION IS UNDEFINED | DESCRIBE $(WEATHER{$(DATE, LOCATION)}) IN ENVIRONEMENT OF SCENE INFORMATION | "WEATHER{$(DATE, LOCATION)}" |
| 030 | NAME OF CHARACTER INFORMATION IS $(USER) | DELETE $(USER) FROM CHARACTER NAME AND DESCRIBE $(USERNAME) | "USERNAME" |
| 031 | * | DESCRIBE $(ENCOUNTER{$(DATE)}) IN NAME OF CHARACTER | "ENCOUNTER{$(DATE)}" |
| 040 | ATTRIBUTE OF CHARACTER INFORMATION IS UNDEFINED | DESCRIBE $(PROFILE{$(NAME)}) IN ATTRIBUTE OF CHARACTER | "PROFILE{$(NAME)}" |
| 050 | TARGET OF ACTION$(EAT) OF ACTION INFORMATION IS UNDEFINED | DESCRIBE "(RECEIPT{$(DATE, LOCATION)}&&@FOOD)" IN TARGE OF ACTION $(EAT) OF ACTION INFORMATION | "RECEIPT{$(DATE, LOCATION)}&&@FOOD)" |

FIG.4

| EXTERNAL INFORMATION TYPE 501 | ACQUIRING SOURCE EQUIPMENT 502 | INFORMATION NAME 503 |
|---|---|---|
| LOCATION | GPS EQUIPMENT | LOCATION.LOG |
| | MOBILE TELEPHONE | BASESTATIONAREA.LOG |
| | RFID COMMUNICATION EQUIPMENT | GATENAME.LOG |
| | PDA | SCHEDULE APPLICATION $(DATE).LOCATION |
| DATE | * | CLOCK.DATE |
| WEATHER | COMMUNICATION EQUIPMENT | URI:Weather.com/$(LOCATION)/$(DATE) |
| USERNAME | E-MAIL EQUIPMENT | USERNAME |
| PROFILE | E-MAIL EQUIPMENT | ADDRESS.PROFILE.$(NAME) |
| ENCOUNTER | ENCOUNTER RECORDING EQUIPMENT | ENCOUNTER.$(NAME) |
| RECEIPT | EQUIPMENT PROVIDED WITH ELECTRONIC MONEY FUNCTION | RECEIPT.LOG |
| RECEIVEDMAIL | E-MAIL EQUIPMENT | RECIEVEDMAIL |
| SENDMAIL | E-MAIL EQUIPMENT | SENDMAIL |
| GROUP | E-MAIL EQUIPMENT | ADDRESS.GROUP.$(NAME) |

| ACQUIRING SOURCE EQUIPMENT | INFORMATION NAME | CONTENT |
|---|---|---|
| RFID COMMUNICATION EQUIPMENT | GATENAME.LOG | ... <br> Tue May 17 10:59:09 JST 2005:TICKET GATE OF SINAGAWA STATION <br> Tue May 17 11:26:32 JST 2005:TICKET GATE OF YOKOHAMA STATION <br> Tue May 17 11:55:16 JST 2005:YOKOHAMA CHINESE RESTAURANT A <br> Tue May 17 13:38:26 JST 2005:TICKET GATE OF SAKURAGI-CHO STATION <br> ... |

| SCENARIO INFORMATION NAME 301 | INFORMATION CLASSIFICATION 302 | | CONTENT 303 |
|---|---|---|---|
| SCENE NUMBER | NUMBER | | 1 |
| SCENE INFORMATION | LOCATION | | $(YOKOHAMA, CHINESE RESTAURANT A) |
| | DATE | | $(20050517), $(AROUND 12 O'CLOCK) |
| | ENVIRONMENT | | $(RAIN), $(10 DEGREES) |
| CHARACTER INFORMATION | PERSON 1: NAME | | $(ICHIRO) |
| | PERSON 1: (ATTRIBUTE, ATTRIBUTE VALUE) | | $(SEX, MALE), $(AGE, 25 YEARS OLD) |
| | PERSON 2: NAME | | $(HANAKO) |
| | PERSON 2: (ATTRIBUTE, ATTRIBUTE VALUE) | | $(SEX, FEMALE) |
| ACTION INFORMATION | ACTOR | | $(ICHIRO) |
| | ACTION/STATE | | $(EAT) |
| | ACTION TARGET | | $(B SET) |

| KNOWLEDGE ID | KNOWLEDGE APPLICATION REQUIREMENT | SCENARIO EDITING RULE | EXTERNAL INFORMATION | EDITING RESOURCE INFORMATION |
|---|---|---|---|---|
| 000 | LOCATION OF SCENE INFORMATION IS UNDEFINED | DESCRIBE $(LOCATION($(DATE)) IN LOCATION OF SCENE INFORMATION | "LOCATION$(DATE)" | |
| 010 | DATE OF SCENE INFORMATION IS $(TODAY) | DELETE $(TODAY) FROM DATE OF SCENE INFORMATION AND DESCRIBE $(DATE) | "DATE" | |
| 011 | DATE OF SCENE INFORMATION IS $(YESTERDAY) | DELETE $(YESTERDAY) FROM DATE OF SCENE INFORMATION AND DESCRIBE $(DATE)-1 | "DATE" | |
| ... | ... | SKIP ......... | | |
| 100 | SCENE INFORMATION IS $(STORE) | WHEN "FREQUENCY OF VISITS $(STORE)" IS "HIGH"<br>-ADD ACTOR: $(SHOP CLERK) TO CHARACTER INFORMATION<br>-ADD ACTOR: $(SHOP CLERK), ACTION: $(SAY "HOW ARE YOU TODAY?") AND ACTION TARGET $(USER)<br>-ADD ACTOR: $(SHOP CLERK), ACTION: $(RAISE RIGHT HAND) AND ACTION TARGET: $$(USER) | | "FREQUENCY OF VISITS [$(STORE)]" |
| 101 | THERE ARE A PLURALITY OF CHARACTERS | WHEN "INTIMACY[$(PERSON a), $(PERSON b)]" IS "HIGH"<br>ADD ACTOR: $(PERSON a), ACTION: $(ACT OF EXPRESSING INTIMACY) AND ACTION TARGET: $(PERSON b) | | "INTIMACY[$(PERSON a), $(PERSON b)]" |
| 102 | ACTION TARGET IS PERSON OTHER THAN ACTOR | WHEN "ACTION: $(APOLOGIZE)"<br>CHANGE ACTION TO $(KNEEL ON THE GROUND) IF INTIMACY IS "HIGH"<br>CHANGE ACTION TO $(BOW HIS HEAD) IF INTIMACY IS "LOW" | | "INTIMACY[$(ACTOR), $(PERSON OF ACTION TARGET)]" |
| 103 | ACTION TARGET IS PERSON OTHER THAN ACTOR | WHEN "ACTION: $(GET ANGRY)"<br>CHANGE ACTION $(GET REALLY ANGRY) IF FREQUENCY IS "HIGH"<br>CHANGE ACTION $(CAUTION) IF FREQUENCY IS "LOW" | | "FREQUENCY OF ACTION[$(ACTOR), $(ACTION), $(ACTION TARGET)]" |
| 104 | ACTION OF ACTION INFORMATION IS $(MOVE) | CHANGE ACTION $(RUN) IF SPEED IS "HIGH"<br>CHANGE ACTION $(WALK) IF SPEED IS "LOW" | | "MOVING SPEED[$(DATE)]" |

FIG.11

| EDITING RESOURCE TYPE | GENERATING RULE | ACQUIRED EXTERNAL INFORMATION |
|---|---|---|
| INTIMACY | "GROUP{$(PERSON)}" IS "PRIVATE"<br>-EXTERNAL INFORMATION "INTIMACY" IS "HIGH"<br>"GROUP{$(PERSON)}" IS "PUBLIC"<br>-EXTERNAL INFORAMTION "INTIMACY" IS "LOW" | GROUP{$(PERSON)} |
| INTIMACY | "RECEIVEDMAIL{$(DATE), $(DATE)-1}" INCLUDES 100 OR MORE "$(PERSON)"<br>-EXTERNAL INFORMATION "INTIMACY" IS "HIGH"<br>"RECEIVEDMAIL{$(DATE), $(DATE)-1" INCLUDES LESS THAN 100 "$(PERSON)"<br>-EXTERNAL INFORMATION "INTIMACY" IS "LOW" | RECEIVEDMAIL<br>{$(DATE), $(DATE)-1} |
| FREQUENCY OF VISITS | THERE ARE "FOUR OR MORE" "LOCATIONLOG{$(DATE), $(DATE)-ONE MONTH}"<br>-EXTERNAL INFORMATION "FREQUENCY OF VISITS" IS "HIGH"<br>THERE ARE "LESS THAN FOUR" "LOCATIONLOG{$(DATE), $(DATE)-ONE MONTH}"<br>-EXTERNAL INFORMATION "FREQUENCY OF VISITS" IS "LOW" | LOCATIONLOG<br>{$(DATE), $(DATE)-ONE MONTH} |
| FREQUENCY OF ACTION | "SENDMAIL{($(DATE), $(DATE)-ONE MONTH)}" INCLUDES "FOUR MORE" DESCRIPTIONS OF "$(ACTOR), $(ACTION), $(ACTION TARGET)"<br>-EXTERNAL INFORMATION "FREQUENCY OF ACTION" IS "HIGH"<br>"SENDMAIL{($(DATE), $(DATE)-ONE MONTH)}" INCLUDES "LESS THAN FOUR" DESCRIPTIONS OF "$(ACTOR), $(ACTION), $(ACTION TARGET)"<br>-EXTERNAL INFORMATION "FREQUENCY OF ACTION" IS "LOW" | SENDMAIL<br>{($(DATE), $(DATE)-ONE MONTH)} |
| MOVING SPEED | "LOCATIONLOG{$(DATE), $(DATE)-ONE MINUTE}" IS "200 METERS OR MORE"<br>-EXTERNAL INFORMATION "MOVING SPEED" IS "HIGH"<br>"LOCATIONLOG{$(DATE), $(DATE)-ONE MINUTE}" IS "LESS THAN 200 METERS"<br>-EXTERNAL INFORMATION "MOVING SPEED" IS "LOW" | LOCATIONLOG<br>{$(DATE), $(DATE)-ONE MINUTE} |

| SCENARIO INFORMATION NAME | INFORMATION CLASSIFICATION | CONTENT |
|---|---|---|
| SCENE NUMBER | NUMBER | 1 |
| SCENE INFORMATION | LOCATION | $(YOKOHAMA, CHINESE RESTAURANT A) |
|  | DATE | $(20050517),$(AROUND 12 O' CLOCK) |
|  | ENVIRONMENT | $(RAIN), $(10 DEGREES) |
| CHARACTER INFORMATION | PERSON 1: NAME | $(ICHIRO) |
|  | PERSON 1: (ATTRIBUTE, ATTRIBUTE VALUE) | $(SEX, MALE), $(AGE, 25 YEARS OLD) |
|  | PERSON 2: NAME | $(HANAKO) |
|  | PERSON 2: (ATTRIBUTE, ATTRIBUTE VALUE) | $(SEX, FEMALE) |
|  | PERSON 3: NAME | $(SHOP CLERK) |
|  | PERSON 3: (ATTRIBUTE, ATTRIBUTE VALUE) |  |
| ACTION INFORMATION | ACTOR | $(SHOP CLERK) |
|  | ACTION/STATE | $(SAY "HOW ARE YOU TODAY?") |
|  | ACTION TARGET | $(ICHIRO) |
|  | ACTOR | $(SHOP CLERK) |
|  | ACTION/STATE | $(RAISE HIS HAND) |
|  | ACTION TARGET | $(ICHIRO) |
|  | ACTOR | $(HANAKO) |
|  | ACTION/STATE | $(SMILE) |
|  | ACTION TARGET | $(ICHIRO) |
|  | ACTOR | $(ICHIRO) |
|  | ACTION/STATE | $(EAT) |
|  | ACTION TARGET | $(B SET) |

SCENARIO GENERATION DEVICE, SCENARIO GENERATION METHOD, AND SCENARIO GENERATION PROGRAM

TECHNICAL FIELD

The present invention relates to a scenario generating apparatus, scenario generating method and scenario generating program that automatically generate scenarios for creating computer graphics animation (hereinafter simply "animation") from text inputted by a user.

BACKGROUND ART

Conventionally, an apparatus for creating animation from text inputted by the user has been actively developed (for example, Patent Document 1).

This apparatus creates animation by making the user input a scenario which describes content of animation. By using such an apparatus, the user can create animation at ease without having a special technique for creating animation.

Patent Document 1: Japanese Patent Application Laid-Open No. HEI8-123976

DISCLOSURE OF INVENTION

Problems to be Solved by the Invention

However, in order to create more expressive animation from inputted scenarios, it is necessary to write more information covering, for example, appearance and action of characters, background scene and information of small objects.

First, animation actions performed by the characters need to be written using expression which can be used in the program and corresponds to the action. Therefore, users who are not used to creating scenarios find difficulty writing scenarios. Accordingly, when the user makes characters perform animation action labeled "apologize," for example, there should be allowable expressions such as "Hanako says sorry to Taro" and "Hanako offers an apology to Taro," other than direct expression of "Hanako apologizes to Taro."

Further, even if a character is automatically selected by expressly specifying an actor by describing, for example, "Hanako walks," the user finds difficulty writing how she is dressed and what she has with her, for example.

Furthermore, for example, assuming a scene in a restaurant, it is preferable to put CG (Computer Graphics) materials of tables, chairs and food in the background and specify the brightness of the lighting according to time. However, a single sentence "had a meal in a restaurant" fails to describe other information at all and is inadequate for an animation scenario.

In this way, the user having little or no experience of scenario writing does not know what kind of information should be described in the scenario to create desired animation. That is, there is a problem that users who do not have special knowledge to create animation find difficulty creating a scenario for creating intended animation.

It is therefore an object of the present invention to provide a scenario generating apparatus, scenario generating method and scenario generating program that make it possible to automatically generate scenarios for generating expressive animation that a user desires, even from text created by the user who does not have special knowledge to create animation.

Means for Solving the Problem

The scenario generating apparatus of the present invention automatically generates a scenario for animation from an input sentence and adopts a configuration including: an input sentence analyzing section that analyzes a meaning of a word written in the input sentence and to which category the word corresponds; a scenario generating section that generates a scenario using the analysis result of the input sentence analyzing section; and a scenario editing section that edits the scenario generated by the scenario generating section using information anticipated from a term in the scenario.

The scenario generating method of the present invention automatically generates a scenario for animation from an input sentence and includes the steps of: analyzing a meaning of a word written in the input sentence and to which category the word corresponds; generating the scenario using the analysis result of the input sentence; and editing the generated scenario using information anticipated from a term in the scenario.

The scenario generating program of the present invention is a scenario generating program for automatically generating a scenario for animation from an input sentence, and makes a computer execute the steps of: analyzing a meaning of a word written in the input sentence and to which category the word corresponds; generating the scenario using the analysis result of the input sentence; and editing the generated scenario using information anticipated from a term in the scenario.

Advantageous Effect of the Invention

According to the present invention, it is possible to automatically generate scenarios for generating expressive animation that users desire even from text created by users who do not have special knowledge to create animation, for example, even from an input sentence which does not describe information that is necessary to create animation.

BRIEF DESCRIPTION OF DRAWINGS

FIG. 2 shows an example of an input sentence analyzing dictionary according to Embodiment 1;

FIG. 3 shows an example of an intermediate scenario according to Embodiment 1;

FIG. 4 shows an example of scenario editing knowledge according to Embodiment 1;

FIG. 5 shows an example of external information acquiring knowledge according to Embodiment 1;

FIG. 6 shows an example of external information according to Embodiment 1;

FIG. 7 shows an example of a final scenario outputted from a scenario generating apparatus according to Embodiment 1;

FIG. 11 shows an example of scenario editing knowledge according to Embodiment 2;

FIG. 12 shows an example of editing resource generating knowledge according to Embodiment 2;

FIG. 13 shows an example of a final scenario outputted from a scenario generating apparatus according to Embodiment 2.

BEST MODE FOR CARRYING OUT THE INVENTION

Embodiments of the present invention will be described below with reference to the accompanying drawings.

Embodiment 1

Figure 1:
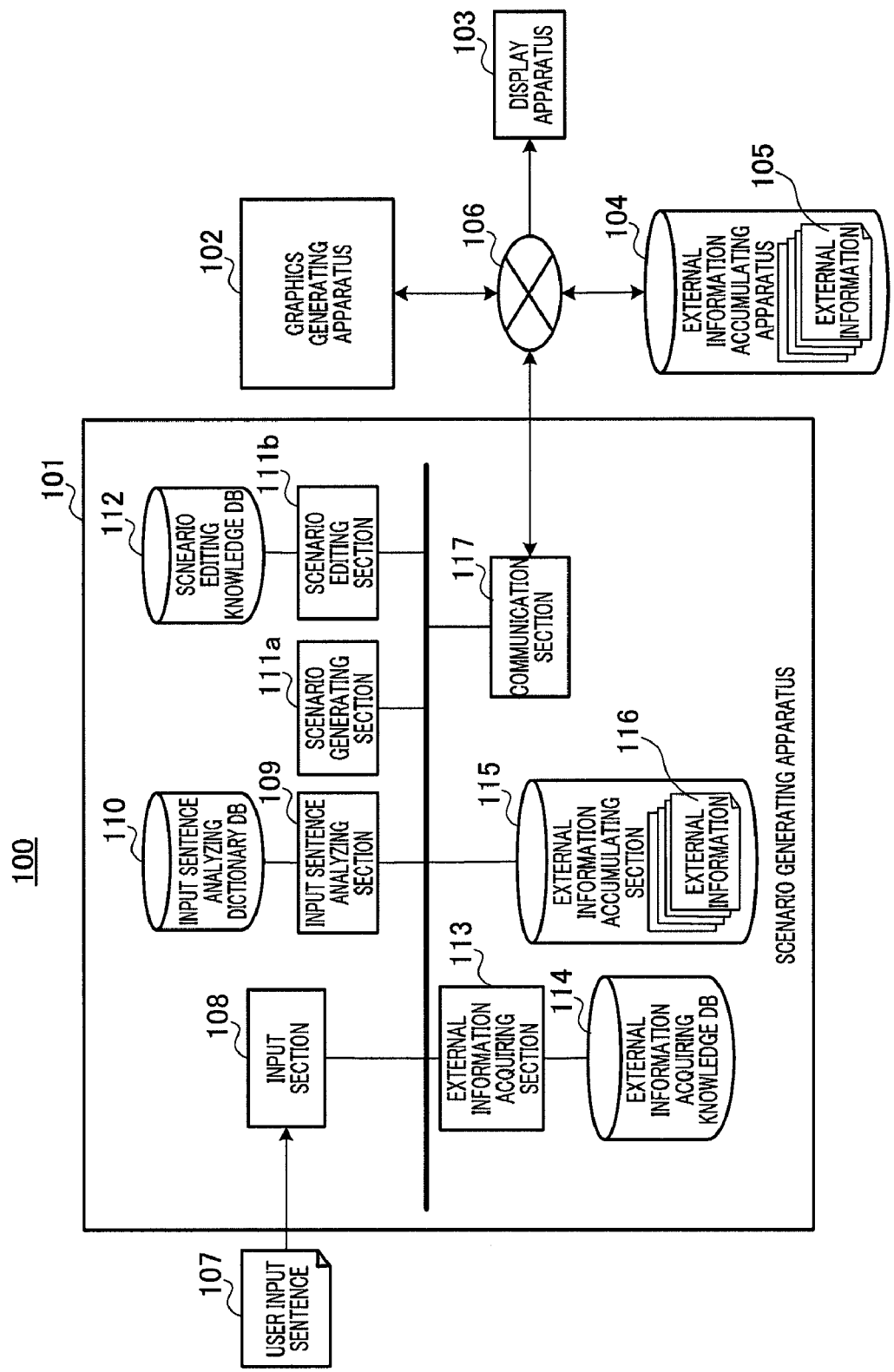
FIG. 1 is a block diagram showing a configuration of an animation creating system including a scenario generating apparatus according to Embodiment 1 of the present invention.

First, the computer graphics animation creating system according to Embodiment 1 of the present invention will be described using FIG. 1. FIG. 1 is a block diagram showing a configuration of the computer graphics animation creating system including the scenario generating apparatus according to Embodiment 1.

In FIG. 1, computer graphics animation creating system (hereinafter simply "animation creating system") 100 is mainly configured with scenario generating apparatus 101, graphics generating apparatus 102, display apparatus 103 and external information accumulating apparatus 104. Scenario generating apparatus 101 acquires user input sentence 107 inputted by the user and outputs information that is necessary to generate animation, as a scenario. Graphics generating apparatus 102 generates animation based on the scenario outputted from scenario generating apparatus 101. Display apparatus 103 displays the animation generated by graphics generating apparatus 102. External information accumulating apparatus 104 accumulates external information 105 used by scenario generating apparatus 101 to compensate for information missing in the scenario or to add new information to the scenario. These apparatuses are connected via general network 106 such as the Internet, mobile communication network and LAN.

In addition, scenario generating apparatus 101, graphics generating apparatus 102, display apparatus 103 and external information accumulating apparatus 104 may be provided to a single apparatus.

Scenario generating apparatus 101 has input section 108 for inputting user input sentence 107. Input section 108 sends user input sentence 107 to input sentence analyzing section 109.

Input sentence analyzing section 109 performs a morphological analysis of user input sentence 107 using input sentence analyzing dictionary data base (DB) 110, divides user input sentence 107 into morphemes, and outputs the morphemes to scenario generating section 111a. The method of division into morphemes is a known technique and therefore will not be described.

Input sentence analyzing dictionary data base 110 stores an input sentence analyzing dictionary for classifying the words obtained from user input sentence 107 through the morphological analysis into categories of information forming the scenario and for assigning definitions to the words. To be more specific, input sentence analyzing dictionary data base 110 stores input sentence analyzing dictionary 110a formed with combinations of word 201, expression 202, which is an event that matches word 201, and classification 203, which is information specifying which category of information forming a scenario the event expressed by word 201 matches, as shown in FIG. 2. In addition, "$" shown in FIG. 2 indicates that the value is an object corresponding to its argument class.

For example, word 201 "yesterday" is associated with expression 202 "$(yesterday)" and classification 203 "date." Further, word 201 "daytime" is associated with expression 202 "$(around 12 o'clock)" and classification 203 "date." This indicates that "daytime" written in user input sentence 107 is a date of around 12 o'clock.

Furthermore, word 201 "I" is associated with expression 202 "$(USER)" and classification 203 "character." This indicates that, when there is a description with "I" in user input sentence 107, the description specifies a person (USER) who writes user input sentence 107 as a character.

Further, word 201 "have a meal" is associated with expression 202 "$(eat)" and classification 203 "action." This indicates that the action "have a meal" written in the scenario is an act of eating.

Using such input sentence analyzing dictionary 110a, input sentence analyzing section 109 analyzes the meaning of word 201 subjected to the morphological analysis in the scenario and which category of information forming the scenario word 201 matches. Input sentence analyzing section 109 outputs expression 202 specifying the meaning of word 201 and classification 203 specifying which category of information forming the scenario word 201 matches, to scenario generating section 111a as an input sentence analysis result.

Scenario generating section 111a acquires the input sentence analysis result (expression 202 and classification 203) sent from input sentence analyzing section 109 and describes an intermediate scenario classifying expression 202 and classification 203 attached to the acquired input sentence analysis result into scene information, character information and action information.

FIG. 3 shows an example of an intermediate scenario according to Embodiment 1. FIG. 3 shows an example of an intermediate scenario created by analyzing user input sentence 107, showing an intermediate scenario when user input sentence 107 is "I ate out lunch yesterday."

As shown in FIG. 3, intermediate scenario 300 is formed with combinations of scenario information name 301, information classification 302 that specifies classification of scenario information name 301 and content 303 that specifies content of information classification 302. Accordingly, scenario information name 301, information classification 302 and content 303 are collectively referred to as "terms."

Scenario information name 301 includes a scene number, scene information, character information and action information. The scene number is a serial number of intermediate scenario 300. The scene information includes information classification 302 of location, date and environment. The character information includes information classification 302 of a person specified by a name and a person specified by an attribute and an attribute value. Further, action information includes information classification 302 of the actor, action/state and target of action.

Information classification 302 corresponds to classification 203 of input sentence analyzing dictionary 110a. In content 303, expression 202 sent from input sentence analyzing section 109 is described.

For example, in expression 202 "$(yesterday)" and "$(around 12 o'clock)" sent from input sentence analyzing section 109, classification 203 is "date." Therefore, scenario generating section 111a describes expression 202 "$(yesterday)" and "$(around 12 o'clock)" in content 303 in which information classification 302 matches the category of "date."

Further, in expression 202 "$(USER)" sent from input sentence analyzing section 109, classification 203 is "character." Therefore, scenario generating section 111a describes expression 202 "$(USER)" in content 303 in which information classification 302 matches the categories of "person 1: name" and "actor."

Furthermore, in expression 202 "$(eat)" sent from input sentence analyzing section 109, classification 203 is "action." Therefore, scenario generating section 111a describes expression 202 "$(eat)" in content 303 in which information classification 302 matches the category "action/state."

In this way, scenario generating section 111a classifies content of morphemes subjected to the morphological analysis according to the meanings and describes the content in predetermined parts in the scenario. Scenario generating section 111a then outputs generated intermediate scenario 300 to scenario editing section 111b.

Scenario editing section 111b specifies information that is missing in content 303 in the scene information, character information and action information described in intermediate scenario 300 inputted from scenario generating section 111a, using the scenario editing knowledge stored in scenario editing knowledge data base (DB) 112 and compensates for intermediate scenario 300. That is, scenario editing section 111b specifies information which is necessary to form the scenario and which is nevertheless missing, and compensates for intermediate scenario 300. In other words, scenario editing section 111b specifies information anticipated from the terms (scenario information name 301, information classification 302 and content 303) in intermediate scenario 300 and edits intermediate scenario 300 using the specified information. By this means, scenario editing section 111b generates a final scenario by describing intermediate scenario 300 adequately. Scenario editing section 111b then sends the generated final scenario to graphics generating apparatus 102 via communication section 117.

FIG. 4 shows an example of a structure of the scenario editing knowledge stored in scenario editing knowledge database 112 according to Embodiment 1. FIG. 4 shows an example of the scenario editing knowledge. Scenario editing knowledge 112a specifies information which should be used to compensate for (be added to) intermediate scenario 300 to clarify intermediate scenario 300, external information to be acquired to compensate for (add) the information and an editing rule specifying how to edit and add the acquired external information to intermediate scenario 300.

To be more specific, as shown in FIG. 4, scenario editing knowledge data base 112 stores scenario editing knowledge 112a which is formed with combinations of knowledge ID 401, knowledge application requirement 402, external information 403 and scenario editing rule 404.

Knowledge ID 401 is identification number of the above-described combination. Knowledge application requirement 402 defines which scene information, character information and action information described in intermediate scenario 300 scenario editing knowledge 112a is used for. In other words, knowledge application requirement 402 is information which should be used to compensate for (be added to) intermediate scenario 300, such as information which is missing in intermediate scenario 300, that is, information for specifying the information anticipated from the terms in intermediate scenario 300.

External information 403 should be acquired when the scenario matches knowledge application requirement 402. In other words, external information 403 is used to compensate for (edit) intermediate scenario 300 and associates terms in intermediate scenario 300 with information anticipated from the terms.

Scenario editing rule 404 defines how to convert and add external information 403 to intermediate scenario 300. That is, scenario editing rule 404 defines how to use external information 403 to compensate for information which is missing in intermediate scenario 300. In other words, scenario editing rule 404 specifies how to use external information 403 to edit intermediate scenario 300 with the information anticipated from the terms in intermediate scenario 300.

For example, in intermediate scenario 300, when "location of scene information" is undefined, knowledge application requirement 402 "location of scene information is undefined" where knowledge ID 401 is "000" is applicable. Therefore, scenario editing section 111b acquires external information 403 "LOCATION{$(date)}" which specifies the location and which uses the date as a parameter, from external information acquiring section 113. Next, according to scenario editing rule 404, scenario editing section 111b describes "$LOCATION{$(date)}" in "location of scene information" in the scenario using acquired external information 403 "LOCATION{$(date)}." In this way, scenario editing section 111b describes appropriate location information in "location of scene information" in intermediate scenario 300 by using "LOCATION{$(date)}" as external information 403.

Further, in intermediate scenario 300, when "date of scene information" is "$(today)," knowledge application requirement 402 "date of scene information is $(today)" where knowledge ID 401 is "010" is applicable. Therefore, scenario editing section 111b acquires external information 403 "DATE" specifying the date from external information acquiring section 113. Next, according to scenario editing rule 404, scenario editing section 111b deletes "$(today)" from "date of scene information" in the scenario and describes "$(DATE)" using acquired external information 403 "DATE." In this way, scenario editing section 111b describes appropriate date information in "date of scene information" in intermediate scenario 300 by using "DATE" as external information 403.

Furthermore, in intermediate scenario 300, when "date of scene information" is "$(yesterday), knowledge application requirement 402 "date of scene information is $(yesterday)" where knowledge ID 401 is "011" is applicable. Therefore, scenario editing section 111b acquires external information 403 "DATE" specifying the date, from external information acquiring section 113. Next, according to scenario editing rule 404, scenario editing section 111b deletes "$(yesterday)" from "date of scene information" and describes "$(DATE)-1" using acquired external information 403 "DATE." In this way, scenario editing section 111b describes appropriate date information in "date of scene information" in intermediate scenario 300 by using "DATE" as external information 403.

Further, in intermediate scenario 300, when "environment of scene information" is undefined, knowledge application requirement 402 "environment of scene information is undefined" where knowledge ID 401 is "020" is applicable. Therefore, scenario editing section 111b acquires external information 403 "WEATHER{$(date, location)}" which specifies the environment and which uses the date and location as parameters, from external information acquiring section 113. Next, according to scenario editing rule 404, scenario editing section 111b describes "$WEATHER{$(date, location)}" in "environment of scene information" in the scenario using acquired external information 403 "WEATHER{$(date, location)}." In this way, scenario editing section 111b describes appropriate environment information in "environment of scene information" in intermediate scenario 300 by using "$WEATHER{$(date, location)}" as external information 403.

Further, in intermediate scenario 300, when "person 1 of character information: name" (hereinafter "character name" as appropriate) is "$(USER)," knowledge application requirement 402 "name of character information is $(USER)" where knowledge ID 401 is "030" is applicable. Therefore, scenario editing section 111b acquires external information 403 "USERNAME" specifying the name of the user, from external information acquiring section 113. Next, according to scenario editing rule 404, scenario editing section 111b deletes "$(USER)" from "character name" in the scenario and describes "$(USER)" using acquired external information 403 "USERNAME." In this way, scenario editing section 111b describes appropriate name information in "character name" in intermediate scenario 300 by using "USERNAME" as external information 403.

Furthermore, in intermediate scenario 300, when "person 1 of character information: (attribute, attribute value)" (hereinafter "attribute of character" as appropriate) is undefined, knowledge application requirement 402 "attribute of character information is undefined" where knowledge ID 401 is "040" is applicable. Therefore, scenario editing section 111b acquires external information 403 "PROFILE{$(name)}" which specifies the attribute of the character and which uses the name as a parameter, from external information acquiring section 113. Next, according to scenario editing rule 404, scenario editing section 111b describes "$(PROFILE{$(name)}" in "attribute of character" using acquired external information 403 "PROFILE{$(name)}." In this way, scenario editing section 111b describes appropriate character attribute information in "attribute of character" in intermediate scenario 300 by using "PROFILE{$(name)}" as external information 403.

Further, in intermediate scenario 300, when "action target of action information" is undefined, knowledge application requirement 402 "target of action $(eat) of action information is undefined" where knowledge ID 401 is "050" is applicable. Therefore, scenario editing section 111b acquires external information 403 "(RECEIPT{$(date, location)})&& (@food)" which specifies the purchasing history and which uses the date and location as parameters, from external information acquiring section 113. Next, according to scenario editing rule 404, scenario editing section 111b describes "(RECEIPT{$(date, location)})&&(@food)" in "action target of action information" using acquired external information 403 "(RECEIPT{$(date, location)})&&(@food)." In this way, scenario editing section 111b describes appropriate action target information in "action target of action information" in intermediate scenario 300 by using "(RECEIPT{$ (date, location)})&&(@food)" as external information 403. "&&" represents "and," and "@" represents type (class).

Furthermore, knowledge application requirement 402 "*" where knowledge ID 401 is "031," specifies that the scenario applies to all cases. Therefore scenario editing section 111b requests external information acquiring section 113 to describe external information 403 "ENCOUNTER {$(date)}" showing the person who was going along with the user at the date, in all cases. Next, according to scenario editing rule 404, scenario editing section 111b describes "$(ENCOUNTER{$(date)})" in a character name using acquired external information 403 "ENCOUNTER {$(date)}." In this way, scenario editing section 111b describes a new character in intermediate scenario 300 by using "ENCOUNTER{$(date)}" as external information 403.

In this way, scenario editing section 111b generates a final scenario by compensating for information missing in intermediate scenario 300, that is, by compensating for necessary information, using external information and editing the content of intermediate scenario 300 appropriately. That is, scenario editing section 111b adds new information to intermediate scenario 300 using the external information and generates a final scenario. Further, scenario editing section 111b performs processing of generating a final scenario by compensating for information missing in intermediate scenario 300 (adding new information) using scenario editing knowledge 112a, so that it is possible to update processing of scenario editing section 111b only by updating scenario editing knowledge 112a.

Next, external information acquiring section 113 will be described.

External information acquiring section 113 obtains a method of acquiring external information requested by scenario editing section 111b from external information acquiring knowledge data base (DB) 114, and acquires the external information from external information accumulating section 115 or from external information accumulating apparatus 104 via network 106 using communication section 117. External information acquiring section 113 provides the external information which is acquired using the external information acquiring knowledge stored in external information acquiring knowledge data base 114, to scenario editing section 111b which is the requesting source.

The external information acquiring knowledge stored in external information acquiring knowledge data base 114 according to Embodiment 1 will be described using FIG. 5. FIG. 5 shows an example of the external information acquiring knowledge specifying an acquiring source of external information.

As shown in FIG. 5, external information acquiring knowledge 114a is formed with combinations of external information type 501 specifying a type of external information, acquiring source equipment 502 specifying an external information acquiring means and information name 503 that is acquired from acquiring source equipment 502. Acquiring source equipment 502 described in external information acquiring knowledge 114a has external information accumulating apparatus 104 shown in FIG. 1, for example.

For example, acquiring source equipment 502 where external information type 501 is "LOCATION" specifying location information, includes GPS (Global Positioning System) equipment, mobile telephone, RFID (Radio Frequency Identification) communication equipment and PDA (Personal Digital Assistant). Information name 503 acquired from acquiring source equipment 502 is "LOCATION.LOG" in the case of GPS equipment, "BASESTATIONAREA.LOG" in the case of a mobile telephone, "GATENAME.LOG" in the case of RFID communication equipment and "SCHEDULE APPLICATION $(date).location" in the case of a PDA. Further, acquiring source equipment 501 where external information type 501 is "LOCATION" specifying location information has higher priority when described at the upper part in the figure.

Furthermore, "*" is described in acquiring source equipment 502 where external information type 501 is "DATE" specifying date information. This indicates that any equipment is possible if it is possible to inquire as to information name 503 "CLOCK.DATE."

In addition, when external information acquiring section 113 tries to acquire external information type 501 from acquiring source equipment 502, a case may occur where external information acquiring section 113 cannot temporarily communicate with acquiring source equipment 502 or where acquiring source equipment 502 cannot temporarily acquire the desired external information. To enable external information acquiring section 113 to acquire external information in this case, external information accumulating section 115 periodically collects information specified by external information acquiring knowledge 114a via communication section 117 and accumulates the collected information. When external information acquiring section 113 cannot acquire information from acquiring source equipment 502 directly, external information acquiring section 113 acquires desired external information 116 by specifying information name 503 to external information accumulating section 115. Further, external information acquiring section 113 may acquire external information 116 from external information accumulating section 115 at all times. By this means, it is possible to acquire necessary external information 105 and 116 more reliably and perform processing faster when external information 116 is acquired from external information accumulating section 115.

Next, a specific example of information acquired from acquiring source equipment 502 will be described using FIG. 6. FIG. 6 shows an example of external information acquired from RFID communication equipment, where information name 503 is "GATENAME.LOG."

As shown in FIG. 6, in content 601 specifying the external information of information name 503 "GATENAME.LOG," which is acquired from acquiring source equipment 502 "RFID communication equipment," a plurality of pairs of dates and locations are described.

Further, communication section 117 shown in FIG. 1 is a communication means that performs communication by connecting to network 106.

In this way, scenario editing section 111b of scenario generating apparatus 101 acquires external information using external information acquiring section 113 and edits an intermediate scenario using the acquired external information according to scenario editing knowledge 112a. By this means, scenario generating apparatus 101 generates a final scenario describing the content of the intermediate scenario adequately, that is, a final scenario where content is added to the intermediate scenario. Scenario editing section 111b then sends the generated final scenario to graphics generating apparatus 102 via communication section 117.

The final scenario according to Embodiment 1 will be described here using FIG. 7. FIG. 7 shows an example of the final scenario.

Final scenario 700 shown in FIG. 7 is obtained by editing the intermediate scenario shown in FIG. 3 using scenario editing knowledge 112a at scenario editing section 111b.

As shown in FIG. 7, information acquired from external information acquiring section 113 is described in final scenario 700. Here, "$(Yokohama, Chinese restaurant A)" is described in "location of scene information," "$(rain), $(10 degrees)" is described in "environment of scene information," "$(sex, male) $(age, 25 years old)" is described in "person 1: (attribute, attribute value) of character information," and, as an added character, "$(Hanako)" is described in "person 2: name of character information," and "$(sex, female)" is described in "person 2: (attribute, attribute value) of character information," and "$(B set)" is described in "action target of action information."

In this way, final scenario 700 is obtained by editing intermediate scenario 300 using external information.

Next, graphics generating apparatus 102 will be described.

Graphics generating apparatus 102 receives scene information, character information and action information from final scenario 700 outputted from scenario generating apparatus 101. Graphics generating apparatus 102 then generates scene data from the inputted scene information, character data from the character information and action data from the action information, and generates animation using these data. Further, graphics generating apparatus 102 sends the generated animation to display apparatus 103. Display apparatus 103 displays the sent animation.

Animation creating system 100 is configured as described above.

Next, the operation of animation creating system 100 will be described.

Figure 8:
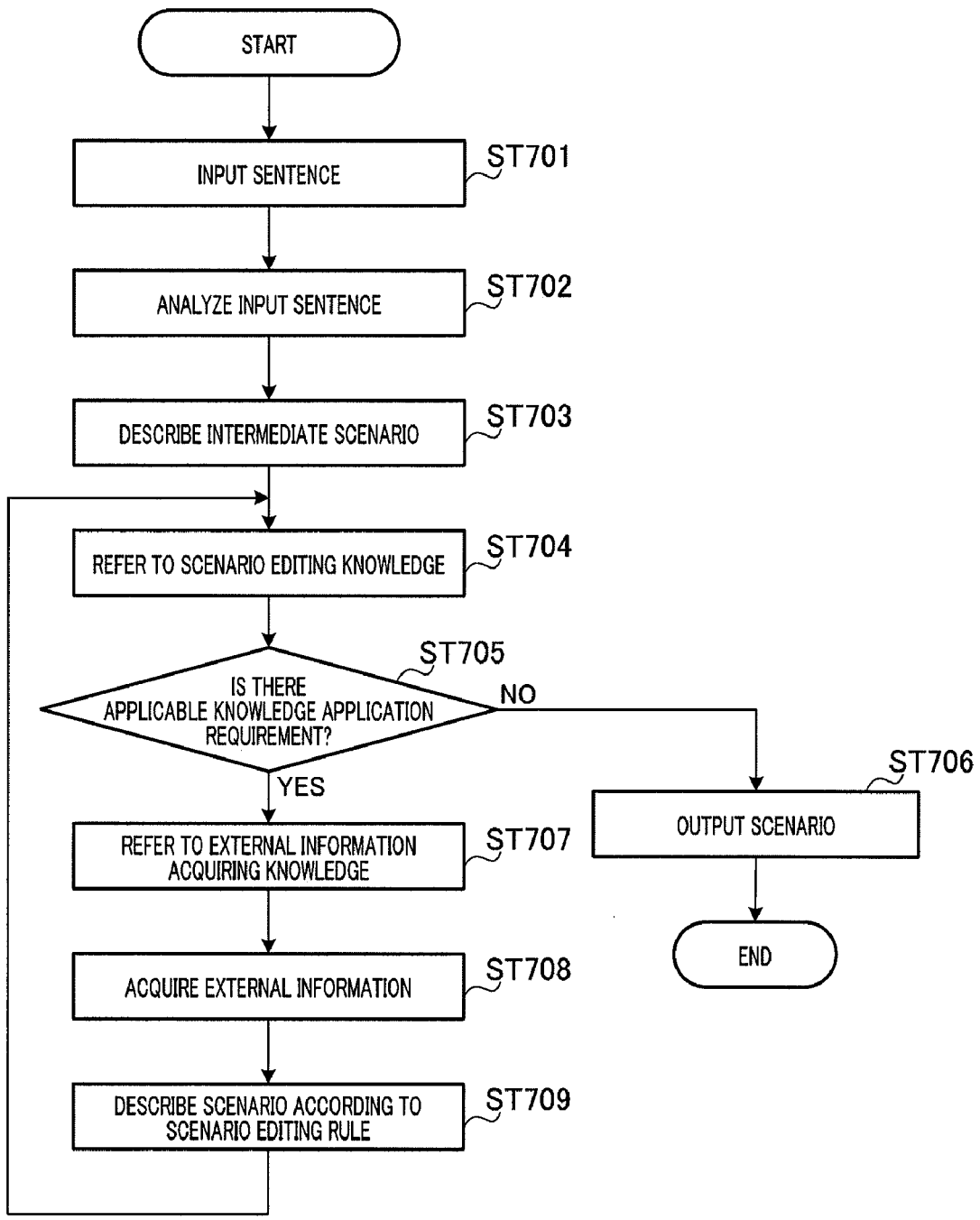
FIG. 8 is a flowchart illustrating an operation of the scenario generating apparatus according to Embodiment 1.

First, the operation of scenario generating apparatus 101 will be described using FIG. 8. FIG. 8 is a flowchart illustrating the operation of scenario generating apparatus 101.

First, scenario generating apparatus 101 receives user input sentence 107 which is a sentence inputted by the user, for example, "I ate out lunch yesterday" as input at input section 108 (ST701). Input section 108 sends user input sentence 107 to input sentence analyzing section 109.

Next, input sentence analyzing section 109 performs a morphological analysis of received user input sentence 107, analyzes user input sentence 107 according to input sentence analyzing dictionary 110a and outputs the result to scenario generating section 111a (ST702) For example, when user input sentence 107 is "I ate out lunch yesterday," input sentence analyzing section 109 extracts "$(yesterday)" and "$(12 o'clock)" as "date of scene information," extracts "$(USER)" as "name of character information" and "actor of action information," and extracts "$(eat)" as "action of action information." Input sentence analyzing section 109 outputs the extraction results to scenario generating section 111a.

In addition, input sentence analyzing section 109 may use a natural language analysis method and vocabulary dictionary which are generally used, and therefore description thereof will be omitted.

Next, scenario generating section 111a describes the input sentence analysis results obtained through processing of ST702 as intermediate scenario 300 (ST702).

For example, to the information "$(yesterday)" and "$(12 o'clock)" outputted from input sentence analyzing section 109, information specifying that this information is "date of scene information" is attached. Therefore, scenario generating section 111a describes "$(yesterday)" and "$(12 o'clock)" as "date of scene information" in intermediate scenario 300 based on this attached information. Further, to information "$(USER)," information specifying that this information is "character information," is attached. Then, based on this attached information, scenario generating section 111a describes "$(USER)" as a name of character information in the scenario. Further, to information "$(eat)," information specifying that this information is "action information," is attached. Then, based on this attached information, scenario generating section 111a describes "$(eat)" as "action/state of action information" in the scenario. Scenario generating section 111a outputs intermediate scenario 300 generated in this way to scenario editing section 111b.

Next, scenario editing section 111b refers to scenario editing knowledge 112a (ST704) and decides whether or not there is knowledge application requirement 402 that is applicable to intermediate scenario 300 inputted from scenario generating section 111a (ST705) In ST705, when there is no knowledge application requirement 402 that is applicable to intermediate scenario 300 (ST705: NO), scenario editing section 111b outputs intermediate scenario 300 as final scenario 700 outputted from scenario generating apparatus 101 (ST706).

On the other hand, when there is knowledge application requirement 402 that is applicable to intermediate scenario 300 (ST705: YES), scenario editing section 111b requests external information 403 to be acquired which is described in scenario editing knowledge 112a, to external information acquiring section 113.

For example, in intermediate scenario 300, "location of scene information," "environment of scene information," "person 1: (attribute, attribute value) of character information" and "action target of action information" are undefined.

That is, intermediate scenario 300 matches knowledge ID "000," "020," "040" and "050" of scenario editing knowledge 112a. Therefore, scenario editing section 111b requests external information acquiring section 113 for "LOCATION{$(date)}," "WEATHER{$(date, location)}," "PROFILE{$(name)}" and "(RECEIPT{$(date, location)}&&(@food)," which are external information specified in external information 403.

On the other hand, external information acquiring section 113 refers to external information acquiring knowledge 114a (ST707) and acquires acquiring source equipment 502 and information name 503 that match the requested external information. External information acquiring section 113 acquires information specified by acquiring source equipment 502 and information name 503 from external information accumulating section 115 or from external information accumulating apparatus 104 via network 106 using communication section 117, and sends the information to scenario editing section 111b (ST708).

To be more specific, external information acquiring section 113 acquires "LOCATION{$(date)}" from "LOCATION.LOG" of GPS equipment, "BASESTATIONAREA.LOG" of a mobile telephone, "GATENAME.LOG" of RFID communication equipment or "SCHEDULE APPLICATION$(DATE).LOCATION" of a PDA. Further, external information acquiring section 113 acquires "WEATHER{$(date, location)}" from "URI: Weather.com/$(LOCATION)/$(date)" of communication equipment, "PROFILE{$(name)}" from "ADDRESS.PROFILE.{$(name)}," and "(RECEIPT{$(date, location)})&&(@food)" from "RECEIPT.LOG" of equipment provided with an electronic money function.

Next, scenario editing section 111b describes the external information acquired in ST708 in intermediate scenario 300 by applying scenario editing rule 404 of scenario editing knowledge 112a (ST709).

Scenario editing section 111b returns to ST704 again, performs the decision of ST705 and repeats the processing of ST704, ST705 and ST707 to ST709 until there is no knowledge application requirement 402 of scenario editing rule 112a that is applicable to the scenario generated in ST709. When there is no knowledge application requirement 402 of scenario editing knowledge 112a that is applicable to the scenario generated in ST709 (ST705: NO), scenario editing section 111b outputs final scenario 700 through the processing of ST706 as described above.

As described above, scenario generating apparatus 101 generates a scenario for creating animation based on user input sentence 107 and external information 116 obtained from external information accumulating apparatus 104 or from external information accumulating section 115, and outputs the scenario to graphics generating apparatus 102.

Figure 9:
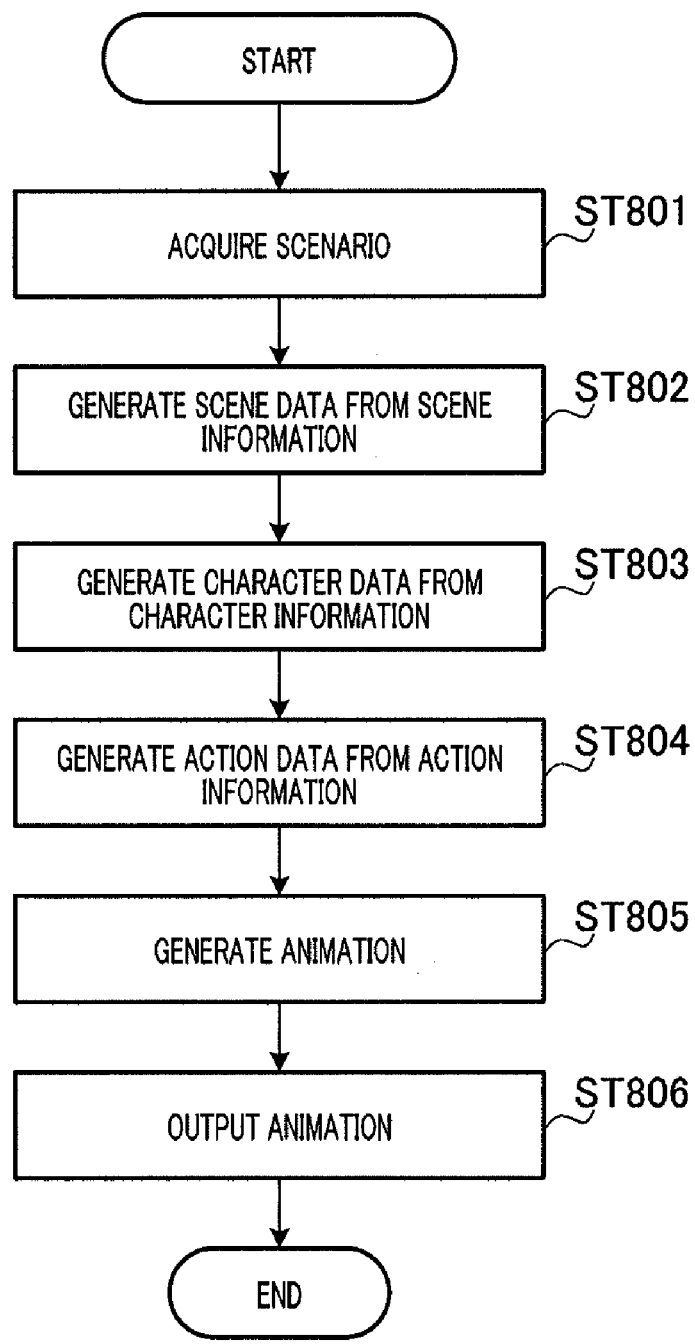
FIG. 9 is a flowchart illustrating an operation of a graphics generating apparatus according to Embodiment 1.

Next, the operation of graphics generating apparatus 102 will be described using FIG. 9. FIG. 9 is a flowchart illustrating the operation of graphics generating apparatus 102.

First, graphics generating apparatus 102 acquires final scenario 700 generated by scenario generating apparatus 101 (ST801).

Next, graphics generating apparatus 102 creates scene data based on the scene information described in final scenario 700 (ST802) For example, in final scenario 700, "$(Yokohama. Chinese restaurant A)" is described as "location of scene information," and "$(rain)" is described as "environment of scene information." Therefore, graphics generating apparatus 102 generates scene data of a Chinese restaurant and scene data showing a rainy background.

Next, graphics generating apparatus 102 creates character data based on the character information described in final scenario 700 (ST803). For example, in final scenario 700, "$(sex, male), $(age, 25 years old)" is described as "person 1: (attribute, attribute value) of character information" and graphics generating apparatus 102 generates a male character in the 20s.

Next, graphics generating apparatus 102 generates action data based on the action information described in final scenario 700 (ST804). For example, in final scenario 700, "$(eat)" is described as "action/state of action information," and graphics generating apparatus 102 generates action data so that the character data generated in ST803 performs an act of eating.

Next, graphics generating apparatus 102 generates animation using the scene data, character data and action data generated in ST802 to ST804 (ST805) and outputs the animation to display apparatus 103 (ST806).

As above, graphics generating apparatus 102 generates animation based on final scenario 700 generated in scenario generating apparatus 101.

As described above, according to Embodiment 1, final scenario 700 is generated by adding information anticipated from the terms in intermediate scenario 300 to intermediate scenario 300 which is created from user input sentence 107. Therefore, for example, even when information that is necessary to generate computer graphics cannot be acquired from intermediate scenario 300, that is, even when information of intermediate scenario 300 is missing, it is possible to compensate for the information by editing necessary information using external information 105 and 116. As a result, it is possible to generate animation with improved expression from intermediate scenario 300.

Further, according to Embodiment 1, external information 105 and 116 are (at least) one of information based on experience of the person inputting the text in the scenario, date information and environment information, so that, by compensating intermediate scenario 300 using external information 105 and 116, it is possible to compensate for intermediate scenario 300 into a form that matches the intent of the person inputting the text, particularly, with expressions close to content based on experience. That is, by adding information to intermediate scenario 300 using external information 105 and 116, it is possible to generate final scenario 700 for realizing more expressive animation which matches the intent of the person inputting the text.

In addition, it is possible to program the processing performed by scenario generating apparatus 101 and make a general-purpose computer execute the program.

Embodiment 2

Next, the animation creating system according to Embodiment 2 of the present invention will be described. The animation creating system according to Embodiment 2 makes it possible to generate information, that is necessary to generate animation from a user input sentence, from external information, even when that information cannot be acquired from the external information.

Figure 10:
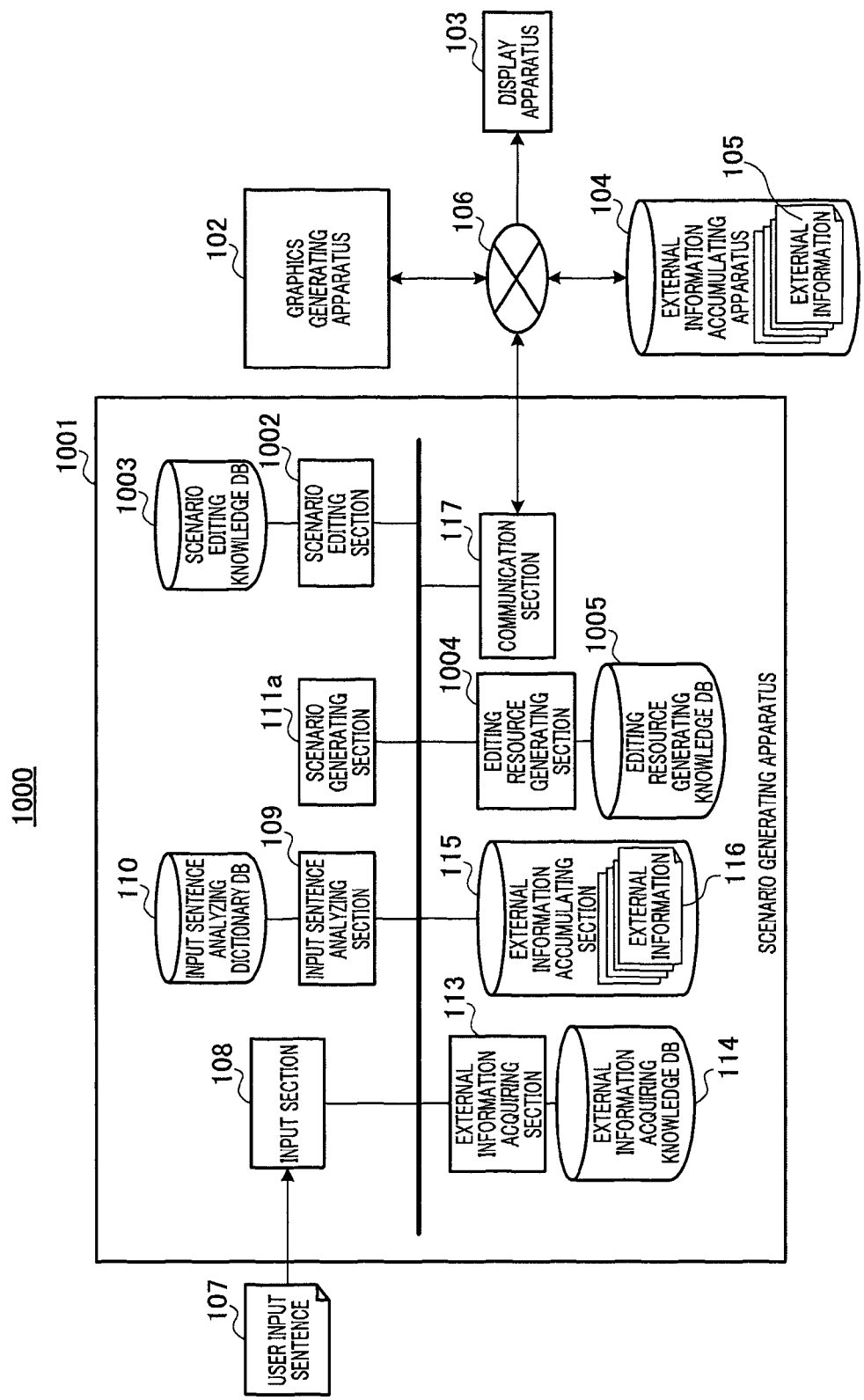
FIG. 10 is a block diagram showing a configuration of a computer graphics animation creating system including the scenario generating apparatus according to Embodiment 2 of the present invention.

First, the animation creating system according to Embodiment 2 will be described using FIG. 10. FIG. 10 is a block diagram showing a configuration of the animation creating system including the scenario generating apparatus according to Embodiment 2. In FIG. 10, the same components as those in FIG. 1 will be assigned the same reference numerals without further explanations.

The configuration of scenario generating apparatus 1001 of animation creating system 1000 according to Embodiment 2 is different from the configuration of scenario generating apparatus 101 of animation creating system 100 according to Embodiment 1. To be more specific, scenario generating apparatus 1001 of animation creating system 1000 has scenario editing section 1002, scenario editing knowledge data base (DB) 1003, editing resource generating section 1004 and editing resource generating knowledge data base (DB) 1005.

Scenario editing section 1002 specifies scene information, character information and action information, which require compensation, for intermediate scenario 300 generated in scenario generating section 111*a*, using scenario editing knowledge stored in scenario editing knowledge data base 1003, and edits intermediate scenario 300 by compensating for these information. In other words, scenario editing section 1002 specifies scene information, character information and action information which should be added to intermediate scenario 300, and edits intermediate scenario 300 by adding these information to intermediate scenario 300. When editing the scene information, character information and action information, scenario editing section 1002 requests editing resource generating section 1004 for editing resource information and requests external information acquiring section 113 for external information, according to the description of the scenario editing knowledge. Editing resource information is generated based on external information 105 and 116 as information that is necessary to generate animation. Scenario editing section 1002 edits the scene information, character information and action information and generates a final scenario based on the obtained editing resource information or external information, and outputs the final scenario to graphics generating apparatus 102.

Editing resource information is generated using external information. Scenario editing section 1002 refers to scenario editing knowledge data base 1003 and decides whether to acquire external information or acquire editing resource information.

Editing resource generating section 1004 generates the editing resource information requested by scenario editing section 1002. To be more specific, editing resource generating section 1004 refers to editing resource generating knowledge data base 1005, acquires necessary external information from external information acquiring section 113 and generates the editing resource information using the acquired external information.

Next, scenario editing knowledge stored in scenario editing knowledge data base 1003 will be described using FIG. 11. FIG. 11 shows an example of the scenario editing knowledge according to Embodiment 2. Scenario editing knowledge 1003*a* specifies what external information or editing resource information to acquire and how to edit a scenario using the acquired external information or editing resource information.

As shown in FIG. 11, scenario editing knowledge 1003*a* is formed with combinations of knowledge ID 1101, knowledge application requirement 1102, external information 1103, resource information 1104 and scenario editing rule 1105. Knowledge ID 1101 is an identification number. Knowledge application requirement 1102 describes application requirements relating to missing information, that is, application requirements for specifying information anticipated from the terms in intermediate scenario 300. External information 1103 describes external information which should be acquired upon match with the requirements. Resource information 1104 describes editing resource information which should be acquired upon match with knowledge application requirement 1102. Scenario editing rule 1105 specifies how to edit a scenario using acquired external information 1103 or editing resource information 1104.

In addition, knowledge ID 1101 of scenario editing knowledge 1003*a* of this embodiment matches knowledge ID 401 of scenario editing rule 112*a* of Embodiment 1, and the same knowledge ID specifies the same content.

For example, when knowledge ID 1101 is "100," knowledge application requirement 1102 is "scene information is $(store)." When this knowledge application requirement 1102 is applied to the scenario, scenario editing section 1002 acquires editing resource information 1104 "frequency of visit {$(store)}" that specifies the frequency the actor visits the store.

Scenario editing section 1002 edits the scenario by applying "frequency of visits {$(store)}" to scenario editing rule 1105. In this case, scenario editing section 1002 adds "$(shop clerk)" to "character information" in the scenario according to scenario editing rule 1105, when "frequency of visits {$(store)}" is "HIGH." Further, when "frequency of visits {$(store)}" is "HIGH," scenario editing section 1002 adds "actor: $(shop clerk)," "action: $(say "how are you today?")" and "action target: $($(USER))" to the scenario. Furthermore, scenario editing section 1002 adds "actor: $(shop clerk)," "action: $(raise right hand)" and "action target: $($(USER))" to the scenario.

When knowledge ID 1101 is "101," knowledge application requirement 1102 is "there are a plurality of characters." When this knowledge application requirement 1102 is applied to the scenario, scenario editing section 1002 acquires editing resource information 1104 "intimacy {$(person a), $(person b)}" that specifies intimacy between characters. Scenario editing section 1002 edits the scenario by applying "intimacy {$(person a) $(person b)}" to scenario editing rule 1105. In this case, when "intimacy {$(person a), $(person b)}" is "HIGH," scenario editing section 1002 adds "$actor: $(person a)," "action: $(act of expressing intimacy)" and "action target: $(person a)" to the scenario according to scenario editing rule 1105.

Further, when knowledge ID 1101 is "102," knowledge application requirement 1102 is "action target is a person other than the actor." When this knowledge application requirement 1102 is applied to the scenario, scenario editing section 1002 acquires editing resource information 1104 "intimacy {$(actor), $(person of action target)}" that specifies intimacy between the actor and the person of action target. Scenario editing section 1002 edits the scenario by applying "intimacy {$(actor), $(person of action target)}" to scenario editing rule 1105. In this case, scenario editing section 1002 changes the action to "$(kneel on the ground)" when action is "action: $(apologize)" and intimacy is "HIGH," and changes the action to "$(bow his head)" when action is "action: $(apologize)" and intimacy is "LOW."

Further, when knowledge ID 1101 is "103," knowledge application requirement 1102 is "action target is a person other than the actor." When this knowledge application requirement 1102 is applied to the scenario, scenario editing section 1002 acquires editing resource information 1104 "frequency of action {$(actor), $(action), $(action target)}" that specifies the frequency the actor performs the action for the action target. Scenario editing section 1002 edits the scenario by applying "frequency of action {$(actor), $(action), $(action target)}" to scenario editing rule 1105. In this case, according to scenario editing rule 1105, scenario editing section 1002 changes the action to "$(get really angry)" when action is "action: $(get angry)" and the frequency is "HIGH,"

and changes the action to "$(caution)" when action is "action: $(get angry)" and frequency is "LOW."

Further, when knowledge ID 1101 is "104," knowledge application requirement 1102 is that action of action information is "$(move)." When this knowledge application requirement 1102 is applied to the scenario, scenario editing section 1002 acquires editing resource information 1104 "moving speed{$(date)}" that specifies the moving speed. Scenario editing section 1002 edits the scenario by applying "moving speed{$(date)}" to scenario editing rule 1105. In this case, according to scenario editing rule 1105, scenario editing section 1002 changes the action to "$(run)" when the speed is "HIGH," and changes the action to "$(walk)" when the speed is "LOW."

In this way, scenario editing section 1002 edits the scenario using scenario editing knowledge 1003a and editing resource information. Further, it is possible to update the processing of scenario editing section 1002 only by updating scenario editing knowledge 1003a.

Next, the editing resource generating knowledge stored in editing resource generating knowledge data base 1005 will be described using FIG. 12. FIG. 12 shows an example of editing resource generating knowledge 1005a for generating requested editing resource information from external information, according to Embodiment 2.

As shown in FIG. 12, editing resource generating knowledge 1005a is formed with combinations of editing resource type 1201 specifying a type of editing resource information, acquired external information 1203 specifying other external information which is source information for generation, and generating rule 1202 specifying a rule for generating the editing resource requested from acquired external information 1203.

Further, there are two types of acquired external information 1203 and generating rule 1202, with respect to "intimacy" of editing resource type 1201 of editing resource generating knowledge 1005a. This indicates that editing resource generating section 1004 can select either knowledge.

For example, when editing resource information of "intimacy" between the scenario generating party and another person is requested, editing resource generating section 1004 requests external information acquiring section 113 for "GROUP{$(person)}" of acquired external information 1203, according to editing resource generating knowledge 1005a. The external information "GROUP{$(person)}" specifies into which group "$(person)" is classified with the social network of the scenario generating party. When the external information "GROUP{$(person)}" requested to external information acquiring section 113 specifies "PRIVATE," editing resource generating section 1004 returns the value "HIGH" for "intimacy" of editing resource information to scenario editing section 1002, according to generating rule 1202. Further, when the external information "GROUP{$(person)}" requested to external information acquiring section 113 specifies "PUBLIC," editing resource generating section 1004 returns the value "LOW" corresponding to "intimacy" of editing resource information to scenario editing section 1002.

Furthermore, when the editing resource information "intimacy" between the scenario generating party and another person is requested, editing resource generating section 1004 may request external information acquiring section 113 for acquired external information 1203 "RECEIVEDMAIL{$(date), $(date)–one month," according to editing resource generating knowledge 1005a. This specifies the number of e-mails sent from "$(person)" to the scenario generating party in one month until "$(date)." When the external information "RECEIVEDMAIL{$(date), $(date)–one month" requested to external information acquiring section 113 specifies that "$(person)" sends "100 or more" e-mails, editing resource generating section 1004 returns the value specifying that "intimacy" of the editing resource information is "HIGH," to scenario editing section 1002, according to generating rule 1202. Further, when the external information "RECEIVEDMAIL{$(date), $(date)–one month" requested to external information acquiring section 113 specifies that "$(person)" sends "less than 100" e-mails, editing resource generating section 1004 returns the value specifying that "intimacy" of the editing resource information is "LOW," to scenario editing section 1002.

Furthermore, when the editing resource information "frequency of visits" of the scenario generating party is requested, editing resource generating section 1004 requests external information acquiring section 113 for acquired external information 1203 "LOCATION.LOG{$(date), $(date)–one month," according to editing resource generating knowledge 105a. This specifies the number of visits in one month until "$(date)." When the external information "LOCATION.LOG{$(date), $(date)–one month" requested to external information acquiring section 113 "four times or more," editing resource generating section 1004 returns the value specifying that the editing resource information "frequency of visits" is "HIGH," to scenario editing section 1002, according to generating rule 1202. Further, when the external information "LOCATION.LOG{$(date), $(date)–one month" requested to external information acquiring section 113 is "less than four times," editing resource generating section 1004 returns the value specifying that the editing resource information "frequency of visits" is "LOW," to scenario editing section 1002.

Furthermore, when the editing resource information "frequency of action" of the scenario generating party performed for another person is requested, editing resource generating section 1004 requests external information acquiring section 113 for acquired external information 1203 "SENDMAIL{{$(date), $(date)–one month}}," according to editing resource generating knowledge 1005a. This indicates the number of e-mails in one month until "$(date)." When "{$(actor), $(action), $(action target)}" in the external information "SENDMAIL{{$(date), $(date)–one month}}" requested to external information acquiring section 113 is "four times or more," editing resource generating section 1004 returns the value specifying that "frequency of action" is "HIGH," to scenario editing section 1002, according to generating rule 1202. Further, when "{$(actor), $(action), $(action target)}" in the external information "SENDMAIL{{$(date), $(date)–one month}}" requested to external information acquiring section 113 is "less than four times," editing resource generating section 1004 returns the value specifying that "frequency of action" is "LOW," to scenario editing section 1002.

Furthermore, when the editing resource information "moving speed" of the scenario generating party is requested, editing resource generating section 1004 requests external information acquiring section 113 for acquired external information 1203 "LOCATION.LOG{$(date), $(date)–one minute," according to editing resource generating knowledge 1005a. This specifies the distance the scenario generating party moves in one minute, from the location of "$(date)" and the location of one minute before "$(date)." When the external information "LOCATION.LOG{$(date), $(date)–one minute}" requested to external information acquiring section 113 is "200 meters or more," editing resource generating section 1004 returns the value specifying that "moving speed" is "HIGH," to scenario editing section 1002, according to generating rule 1202. Further, when the external information "LOCATION.LOG{$(date), $(date)−one minute}" requested to external information acquiring section 113 is "less than 200 meters," editing resource generating section 1004 returns the value specifying that "moving speed" is "LOW", to scenario editing section 1002.

Scenario generating apparatus 1001 according to Embodiment 2 is configured as described above. Here, an example of the final scenario generated when scenario generating apparatus 1001 edits intermediate scenario 300 shown in FIG. 3 of Embodiment 1 will be described in FIG. 13. In final scenario 1300 shown in FIG. 13, "$(Yokohama, Chinese restaurant A)" is described as "location of scene information," "$(rain), $(10 degrees)" is described as "environment of scene information," "$(sex, male), $(age, 25 years old)" is described as "person 1: (attribute, attribute value)" of "character information," "$(Hanako)" is described as added "character name," "$(sex, female)" is described as added "character attribute," and "$(B set)" is described as "action target of action information." These are information which is acquired from external information acquiring section 113 and is not described in intermediate scenario 300. Further, in final scenario 1300, actor "$(shop clerk)," action target "$(Ichiro)" and action/state "$(say "how are you today?")" are described as a character having the name "$(shop clerk)" and action information based on the editing resource information generated using external information instead of the external information itself. Further, in final scenario 1300, actor "$(Hanako)," action target "$(Ichiro)" and action/state "$(smile)" are described as action information based on editing resource information.

In this way, scenario generating apparatus 1001 compensates for information missing in the user input sentence using external information and editing resource, and generates a scenario including adequate information for creating animation that the user desires. In other words, scenario generating apparatus 1001 adds information anticipated from the terms in intermediate scenario 300 generated from the user input sentence to intermediate scenario 300 using external information and editing resource, and edits the scenario.

Figure 14:
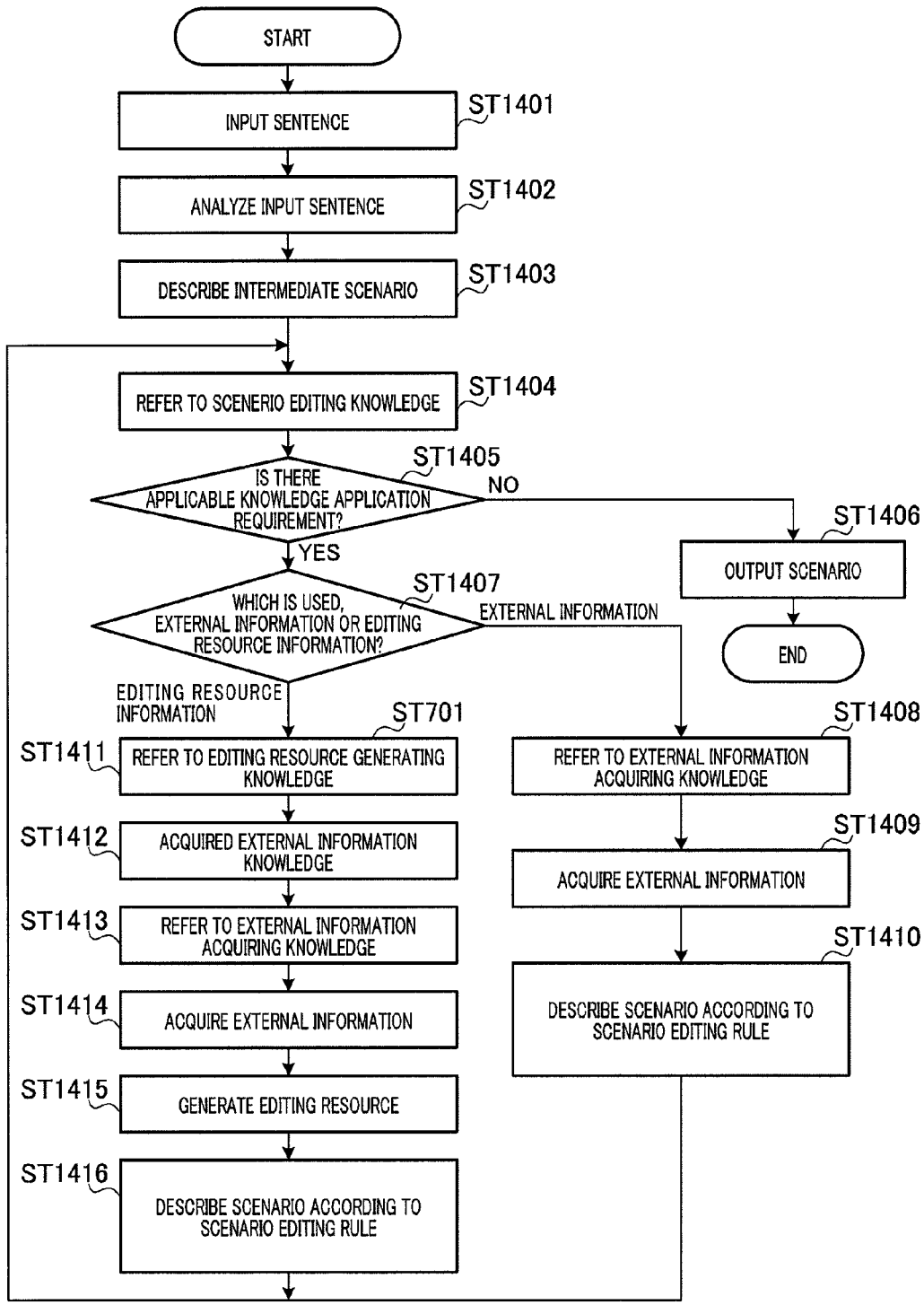
FIG. 14 is a flowchart illustrating an operation of the scenario generating apparatus according to Embodiment 2.

Next, the operation of scenario generating apparatus 1001 will be described. FIG. 14 is a flowchart illustrating the operation of scenario generating apparatus 1001 according to Embodiment 2.

First, scenario generating apparatus 1001 receives user input sentence 107, which is a sentence inputted by the user, as input at input section 108 (ST1401) Input section 108 sends user input sentence 107 to input sentence analyzing section 109.

Next, input sentence analyzing section 109 performs a morphological analysis of received user input sentence 107, analyzes the input sentence according to input sentence analyzing dictionary 110a and outputs the result to scenario editing section 1002 (ST1402). Scenario editing section 1002 then describes the input sentence analysis result obtained through processing of ST1402 as intermediate scenario 300 (ST1403).

Scenario editing section 1002 refers to scenario editing knowledge 1003a (ST1404) and decides whether or not there is knowledge application requirement 1102 that is applicable to intermediate scenario 300 generated in ST1403 (ST1405). When it is decided that there is no knowledge application requirement 1102 that is applicable to intermediate scenario 300 generated in ST1403 (ST1405: NO), scenario editing section 1002 outputs intermediate scenario 300 as a final scenario to be outputted from scenario generating apparatus 1001 (ST1406).

On the other hand, when it is decided that there is knowledge application requirement 1102 that is applicable to intermediate scenario 300 generated in ST1403 (ST1405: YES), scenario editing section 1002 decides whether the information that matches decided knowledge application requirement 1102 is external information 1103 or editing resource information 1104 (ST1407).

When it is decided in ST1407 that the matched information is external information 1103 (ST1407: external information), scenario editing section 1002 requests external information acquiring section 113 for external information 1103 which is described in scenario editing knowledge 1002a and which should be acquired.

In response to this, external information acquiring section 113 refers to external information acquiring knowledge 114a (ST1408) and acquires acquiring source equipment 502 and information name 503 that matches the requested external information. External information acquiring section 113 acquires information specified in acquiring source equipment 502 and information name 503 from external information accumulating section 115 or from external information accumulating apparatus 104 via network 106 using communication section 117, and sends the information to scenario editing section 1002 (ST1409).

Next, scenario editing section 1002 applies the external information acquired in ST1409 to scenario editing rule 1105 of scenario editing knowledge 1003a and describes the external information in final scenario 1300 (ST1410).

Scenario editing section 1002 returns to ST1404 again and performs the decision of ST1405.

On the other hand, when it is decided in ST1407 that the matched information is editing resource information 1104 (ST1407: editing resource information), scenario editing section 1002 requests editing resource generating section 1004 for editing resource information which is described in scenario editing knowledge 1003a and which should be acquired.

In response to this, editing resource generating section 1004 refers to editing resource generating knowledge 1005a (ST1411) and recognizes acquired external information 1203 that matches the requested editing resource information (ST1412). Next, editing resource generating section 1004 requests external information acquiring section 113 for the recognized acquired external information.

In response to this, external information acquiring section 113 refers to external information acquiring knowledge 114a (ST1413) and acquires acquiring source equipment 502 and information name 503 that match the requested external information. External information acquiring section 113 acquires the external information specified in acquiring source equipment 502 and information name 503 from external information accumulating section 115 or from external information accumulating apparatus 104 via network 106 using communication section 117, and sends the external information to editing resource generating section 1004 (ST1414).

Next, editing resource generating section 1004 acquires generating rule 1202 that is applicable to editing resource information 1104 requested by scenario editing section 1002, generates editing resource information by applying the external information acquired in ST1414 to acquired generating rule 1202, and sends the editing resource information to scenario editing section 1002 (ST1415).

Scenario editing section 1002 applies the editing resource information acquired in ST1415 to scenario editing rule 1105 of scenario editing knowledge 1003a and describes the editing resource information in final scenario 1300 (ST1416).

Scenario editing section 1002 returns to ST1404 again and performs the decision of ST1405. In this way, scenario editing section 1002 repeats the processing of ST1404, ST1405 and ST1407 to ST1416 until there is no knowledge application requirement 1102 of scenario editing knowledge 1003a applicable to the scenario generated in ST1410.

In this way, scenario editing section 1002 recognizes information anticipated from the terms in intermediate scenario 300, such as information missing in intermediate scenario 300, as information to be added to intermediate scenario 300 and edits intermediate scenario 300 by adding the information using external information or editing resource information.

For example, a case will be considered where scenario editing section 1002 edits intermediate scenario 300 shown in FIG. 3 in ST1407 to ST1416. First, scenario editing section 1002 generates final scenario 1300 from intermediate scenario 300 in ST1408 to ST1410. This processing is the same as the processing of scenario editing section 111b in Embodiment 1 and therefore will not be described in detail.

Next, a location of scene information in final scenario 1300 is "$(Yokohama, Chinese restaurant A)" and "store" (ST1405), and scenario editing section 1002 judges that the scenario matches knowledge application requirement 1102 where knowledge ID 1101 is "100" in scenario editing knowledge 1003a (ST1407). Therefore, scenario editing section 1002 refers to editing resource information 1104 of scenario editing knowledge 1003a, judges that "frequency of visits {$(Chinese restaurant A))}" is necessary, and requests editing resource generating section 1004 for "frequency of visits {$(Chinese restaurant A))}". "Frequency of visits {$(Chinese restaurant A))}" shows the frequency of visiting "Chinese restaurant A."

In response to this, editing resource generating section 1004 refers to editing resource generating knowledge 1005a (ST1411) and recognizes acquired external information 1203 "LOCATION.LOG{$(date), $(date)–one month}" that matches "frequency of visits {$(Chinese restaurant A))}" (ST1412). Next, editing resource generating section 1004 requests external information acquiring section 113 for "LOCATION.LOG{$(date), $(date)–one month}."

In response to this, external information acquiring section 113 refers to external information acquiring knowledge 114a (ST1413), recognizes GPS equipment, which is acquiring source equipment 502 that matches "LOCATION.LOG{$(date), $(date)–one month}," acquires "LOCATION.LOG{$(date), $(date), $(date)–one month}" from GPS equipment and sends "LOCATION.LOG{$(date), $(date)–one month}" to editing resource generating section 1004 (ST414).

In response to this, editing resource generating section 1004 applies the acquired external information to generating rule 1202 of editing resource generating knowledge 1005a and generates editing resource information, which is, in this case, "frequency of visits: HIGH" (ST1415).

Scenario editing section 1002 compares the editing resource information ("frequency of visits: HIGH") acquired from editing resource generating section 1004 with scenario editing rule 1105a and edits the scenario according to the description (ST1416). In this example, scenario editing rule 1105a specifies that the scenario is edited only when "frequency of visits {$(Chinese restaurant A))}" is "HIGH," and therefore scenario editing section 1002 describes "$(shop clerk)" in "character information" in the scenario. Further, scenario editing rule 1105a describes "$(shop clerk)" in "actor," "$(say "how are you today?")" in "action" and "$($(USER))" in "action target," in the action information in the scenario. Further, scenario editing rule 1105a describes "$(shop clerk)" in "actor," "$(raise right hand)" in "action" and "$($(USER))" in "action target," in the action information in the scenario.

In this way, when the scenario cannot be adequately compensated using external information alone, scenario editing section 1002 generates editing resource from the external information and compensates for the scenario using the editing resource. That is, when information cannot be added to the scenario using the external information alone, scenario editing section 1002 generates editing resource from the external information and edits the scenario using the editing resource. By this means, even when external information accumulating section 115 provided to allow the user to acquire external information or external information accumulating apparatus 104 that exists in a service area, has a small amount of external information, it is possible to increase the amount of information of the outputted scenario.

Further, as described above, when a plurality of characters are described in the scenario, scenario editing section 1002 judges that the scenario matches knowledge application requirement 1102 where knowledge ID 1101 is "101" in scenario editing knowledge 1003a (ST1407). Therefore, scenario editing section 1002 refers to editing resource information 1104 of scenario editing knowledge 1003a, judges that "intimacy{$(person a), $(person b)" is necessary, and requests editing resource generating section 1004 for "intimacy{$(person a), $(person b)." "Intimacy{$(person a), $(person b)" specifies intimacy between characters.

In response to this, editing resource generating section 1004 refers to editing resource generating knowledge 1005a (ST1411) and recognizes acquired external information 1203 "GROUP{$(person)}" and "RECEIVEDMAIL{$(date), $(date)–one month}" that match "intimacy{$(person a), $(person b)}" (ST1412). Editing resource generating section 1004 employs the above-described "GROUP{$(person)}" and requests external information acquiring section 113 for "GROUP{$(person)}."

In response to this, external information acquiring section 113 refers to external information acquiring knowledge 114a (ST1413), recognizes the e-mail equipment which is acquiring source equipment 502 that matches "GROUP{$(person)}" and acquires "ADDRESS.GROUP.$(name)" of the e-mail equipment. External information acquiring section 113 sends the acquired "ADDRESS.GROUP.$(name)" to editing resource generating section 1004 as "GROUP{$(person)}" (ST1414).

In response to this, editing resource generating section 1004 applies the acquired external information to generating rule 1202 of editing resource generating knowledge 1005a and generates editing resource information, which is, in this case, "intimacy: HIGH" (ST1415).

Scenario editing section 1002 compares the editing resource information acquired from editing resource generating section 1004 with scenario editing rule 1105 and edits the scenario according to the description (ST1416). In this example, "intimacy{$(person a), $(person b)}" is "HIGH," and scenario editing section 1002 adds to the scenario "Hanako" as "actor: $(person a)," "smile" as "action: S(act of expressing intimacy)" and "Ichiro" as "action target: $(person b)," and edits final scenario 1300.

In this way, even when information that is necessary to generate animation cannot be acquired from external information 105 and 116, scenario editing section 1002 generates editing resource from external information 105 and 116, and can edit the scenario with the expression close to the user's intent using the editing resource. As a result, it is possible to improve expression of animation.

As described above, according to Embodiment 2, even when information that is necessary to generate animation cannot be acquired from user input sentence 107, it is possible to interpret the external information and edit the scenario with the expression close to the user's intent.

Further, according to Embodiment 2, even when information that is necessary to generate animation cannot be acquired from external information 105 and 116, it is possible to generate editing resources from external information 105 and 116, and make the expression close to the user's intent using the editing resource information. As a result, it is possible to improve expression of animation.

Further, according to Embodiment 2, when the scenario cannot be compensated using external information 105 and 116 alone, by generating editing resource from external information 105 and 116, it is possible to compensate for the scenario using the editing resource. That is, when information cannot be added to the scenario using external information 105 and 116 alone, it is possible to generate editing resource from external information 105 and 116, and add information to the scenario using the editing resource. By this means, even when external information accumulating section 115 provided to allow the user to acquire external information or external information accumulating apparatus 104 that exists in a service area has a small amount of external information, it is possible to increase the amount of information of the outputted scenario. That is, it is necessary to accumulate only a small amount of external information 105 and 116 in advance, so that it is possible to reduce the number of external information accumulating section 115 or external information accumulating apparatus 104 that exists in the service area.

In addition, it is possible to program the operation of scenario generating apparatus 1001 and make a general-purpose computer execute the program.

As described above, the scenario generating apparatus according to the present invention recognizes information missing in text created by the user, acquires external information from equipment that the user has or equipment that exists in the service area, compensates for the missing information using the acquired external information and edits the scenario. To be more specific, the scenario generating apparatus generates a scenario from text created by the user, recognizes information anticipated from the terms in the generated scenario as information to be added to the scenario, acquires external information from the equipment that the user has or the equipment that exists in the service area, adds information to the scenario using the acquired external information and edits the scenario.

Therefore, according to the scenario generating apparatus of the present invention, even when information that is necessary to create computer graphics is not described in an input sentence, it is possible to interpret external information using meaning representation of a word included in the input sentence and compensate for (add) the information that is necessary to generate computer graphics expression that matches the sentence inputted by the user. Further, it is possible to optimize modification relating to scene and action described in the generated scenario based on a value obtained from the external information. From the scenario generated in this way, further expressive computer graphics can be generated for the sentence inputted by the user. That is, the scenario generating apparatus according to the present invention allows the user to create expressive computer graphics at ease, even when the user does not have a technique and information necessary to create computer graphics.

In short, the scenario generating apparatus according to a first aspect of the present invention adopts a configuration including: an analyzing section that outputs expression specifying a meaning of a word described in an input sentence and classification of the word as an analysis result; an external information accumulating section that accumulates external information; and a scenario editing section that edits a scenario using the analysis result and the external information acquired from the external information acquiring section.

By this means, even when information that is necessary to create computer graphics is not included in the input sentence, that is, even when a scenario cannot be generated from the input sentence alone, it is possible to compensate for necessary information and generate a scenario using the external information. As a result, it is possible to generate graphics with improved expression based on the scenario for which information is compensated.

According to a second aspect of the present invention, in the scenario generating apparatus according to the first aspect, the external information is one of information based on experience of an input sentence creating party, date information and environment information.

By this means, it is possible to compensate for the scenario into a form that matches the intent of the input sentence creating party, particularly, using expressions close to the content based on experience of the input sentence creating party.

According to a third aspect of the present invention, the scenario generating apparatus according to the first aspect or second aspect further includes an editing resource generating section that generates editing resource information from the external information, and the scenario editing section further edits the scenario using the editing resource information.

By this means, it is possible to generate editing resource information for compensating the scenario from external information. As a result, for example, even when external information for compensating the scenario cannot be acquired, it is possible to generate editing resource information from other external information that can be acquired, and compensate for the scenario using this editing resource information. Further, in this way, the editing resource information is generated for compensating the scenario, so that it is possible to reduce the amount of external information accumulated in advance in the external information accumulating section and compensate for the scenario by obtaining a large amount of editing resource information from a small amount of external information.

According to a fourth aspect of the present invention, the scenario generating apparatus according to any one of the first aspect to the third aspect further includes scenario editing knowledge that stores a plurality of combinations of knowledge application requirements for specifying information to be provided to the scenario, the external information to be used for obtaining the information to be provided and an editing rule specifying how to add the external information to be used to the scenario, and the scenario editing section specifies the information to be provided using the knowledge application requirements and adds the external information to be used to the scenario using the editing rule.

By this means, the scenario editing section can edit the scenario using scenario editing knowledge and external information. Further, it is possible to update the processing of the scenario editing section only by updating the scenario editing knowledge.

According to a fifth aspect of the present invention, the scenario generating apparatus according to the third aspect further includes scenario editing knowledge that stores a plurality of combinations of knowledge application requirements for specifying information to be provided to the scenario, the editing resource information to be used for obtaining the information to be provided and an editing rule specifying how to generate information based on the editing resource information to be used and add the information to the scenario, and the scenario editing section specifies the information to be provided using the knowledge application requirements and generates the information based on the editing resource information to be used using the editing rule and adds the information to the scenario.

By this means, the scenario editing section can edit the scenario using the scenario editing knowledge and editing resource information. Further, it is possible to update the processing of the scenario editing section only by updating the scenario editing knowledge.

According to a sixth aspect of the present invention, the scenario generating apparatus according to one of the third aspect and the fifth aspect adopts a configuration further including editing resource generating knowledge that stores a plurality of combinations of external information for generating the editing resource information and a generating rule for generating the resource information using the external information, and an editing resource generating section that generates the editing resource information requested from the scenario editing section using the editing resource generating knowledge and sends the editing resource information to the scenario editing section.

By this means, even when external information for compensating the scenario cannot be acquired, it is possible to generate editing resource information from other external information that can be acquired, and compensate for the scenario using this editing resource information.

The computer graphics generating system according to a seventh aspect of the present invention adopts a configuration including: the scenario generating apparatus according to one of the first to sixth aspects; and a graphics generating apparatus that generates computer graphics using the scenario outputted by the scenario generating apparatus.

By this means, it is possible to generate computer graphics using the scenario generated by the scenario generating apparatus.

An eighth aspect of the present invention is a scenario generating method including the steps of: outputting expression specifying a meaning of a word described in an input sentence and classification of the word as an analysis result; accumulating external information; editing a scenario using the analysis result; acquiring the external information; and editing the scenario using the external information.

A ninth aspect of the present invention is a program that makes a computer execute the steps of: outputting expression specifying a meaning of a word described in an input sentence and classification of the word as an analysis result; accumulating external information; editing a scenario using the analysis result; acquiring the external information; and editing the scenario using the external information.

The present application is based on Japanese Patent Application No. 2005-171492, filed on Jun. 10, 2005, the entire content of which is expressly incorporated by reference herein.

INDUSTRIAL APPLICABILITY

As described above, according to the present invention, it is possible to generate scenarios for generating expressive computer graphics that users desire from scenarios generated by users who do not have special knowledge to create animation. The present invention makes it possible to distribute information using animation by applying to mobile telephones or e-mail as well as dedicated apparatuses for creating animation.

The invention claimed is:

1. A scenario generating apparatus that automatically generates a scenario for animation from an input sentence, the scenario generating apparatus comprising:
   an input for entering the input sentence into the scenario generating apparatus;
   an input sentence analyzer that analyzes a meaning of a word written in the input sentence and to which category the word corresponds;
   a scenario generator that generates a scenario using the analysis result of the input sentence analyzer;
   a scenario editor that edits the scenario generated by the scenario generator using information anticipated from a term in the scenario, wherein the anticipated information is acquired from the term in the scenario using external information associating the term with the information anticipated from the term;
   an external information acquiring knowledge storage that stores external information acquiring knowledge, comprising a combination of a type of the external information and acquiring source information relating to an acquiring source of the external information, wherein the external information is acquired using the external information acquiring knowledge stored in the external information acquiring knowledge storage; and
   a communicator, connected to a network, for controlling network communication with the scenario generating apparatus.

2. The scenario generating apparatus according to claim 1, wherein the external information is accumulated in at least one of an external information accumulating section provided in the scenario generating apparatus and an external information accumulating apparatus provided outside the scenario generating apparatus, and
   the external information is acquired from at least one of the external information accumulating section and the external information accumulating apparatus.

3. The scenario generating apparatus according to claim 1, wherein the external information comprises at least one of information based on experience of an input sentence creating party, date information and environment information.

4. The scenario generating apparatus according to claim 1, further comprising:
   an editing resource generator that generates editing resource information from the acquired external information,
   wherein the scenario editor edits the scenario generated by the scenario generator using at least one of the acquired external information and the editing resource information generated by the editing resource generator.

5. The scenario generating apparatus according to claim 1, further comprising:
   a scenario editing knowledge storage that stores scenario editing knowledge, comprising a combination of a knowledge application requirement for specifying information anticipated from a term in the scenario, external information that needs to be acquired according to the knowledge application requirement and an editing rule specifying how to edit the scenario using the acquired external information, wherein the scenario editor specifies information anticipated from the term in the scenario generated by the scenario generator using the knowledge application requirement and edits the scenario generated by the scenario generator according to the editing rule using the external information acquired according to the knowledge application requirement, with reference to the scenario editing knowledge stored in the scenario editing knowledge storage.

6. The scenario generating apparatus according to claim 4, further comprising:
a scenario editing knowledge storage that stores scenario editing knowledge, comprising a combination of a knowledge application requirement for specifying information anticipated from a term in the scenario, at least one of external information that needs to be acquired according to the knowledge application requirement and editing resource information, and an editing rule specifying how to edit the scenario using at least one of the acquired external information and the editing resource information,
wherein the scenario editor specifies information anticipated from the term in the scenario generated by the scenario generator and edits the scenario generated by the scenario generator according to the editing rule using at least one of the external information acquired according to the knowledge application requirement and editing resource information, with reference to the scenario editing knowledge stored in the scenario editing knowledge storage.

7. The scenario generating apparatus according to claim 4, further comprising:
an editing resource generating knowledge storage that stores editing resource generating knowledge, comprising a combination of a type of the editing resource information, the external information to be used to generate the editing resource information and a generating rule for generating the editing resource information using the external information,
wherein the editing resource generator generates editing resource information requested from the scenario editor with reference to the editing resource generating knowledge stored in the editing resource generating knowledge storage, and outputs the editing resource information to the scenario editor.

8. An animation creating system, comprising:
the scenario generating apparatus according to claim 1; and
a graphics generating apparatus that generates computer graphics animation using a scenario generated by the scenario generating apparatus.

9. A scenario generating method for automatically generating a scenario for animation from an input sentence, the scenario generating method comprising:
analyzing, by executing a set of instructions by a computer, a meaning of a word written in the input sentence and to which category the word corresponds;
generating the scenario using the analysis result of the input sentence;
editing, by executing a set of instructions by a computer, the generated scenario using information anticipated from a term in the scenario, wherein the anticipated information is acquired from the term in the scenario using external information associating the term with the information anticipated from the term; and
storing, by executing a set of instructions by a computer, in an external information acquiring knowledge storage the external information acquiring knowledge, comprising a combination of a type of the external information and acquiring source information relating to an acquiring source of the external information,
wherein the external information is acquired using the external information acquiring knowledge stored in the external information acquiring knowledge storage.

10. A non-transitory computer-readable storage medium that stores a computer-executable scenario generating program for automatically generating a scenario for animation from an input sentence, the scenario generating program making a computer execute:
analyzing a meaning of a word described in the input sentence and to which category the word corresponds;
generating the scenario using the analysis result of the input sentence;
acquiring external information;
editing the generated scenario using the acquired external information and information anticipated from a term in the scenario, wherein the anticipated information is acquired from the term in the scenario using external information associating the term with the information anticipated from the term; and
storing in the external information acquiring knowledge storage an external information acquiring knowledge, comprising a combination of a type of the external information and acquiring source information relating to an acquiring source of the external information,
wherein the external information is acquired using the external information acquiring knowledge stored in the external information acquiring knowledge storage.

* * * * *